United States Patent
Ayash et al.

(10) Patent No.: US 11,640,271 B2
(45) Date of Patent: May 2, 2023

(54) CUSTOM COLOR UNIQUE IDENTIFIER OVERRIDE WORKFLOW

(71) Applicant: Xerox Corporation, Norwalk, CT (US)

(72) Inventors: Barry K. Ayash, Webster, NY (US); Mark Rule, Rochester, NY (US); David B. Montfort, Webster, NY (US)

(73) Assignee: XEROX CORPORATION, Norwalk, CT (US)

(*) Notice: Subject to any disclaimer, the term of this patent is extended or adjusted under 35 U.S.C. 154(b) by 0 days.

(21) Appl. No.: 17/358,699

(22) Filed: Jun. 25, 2021

(65) Prior Publication Data
US 2022/0413775 A1  Dec. 29, 2022

(51) Int. Cl.
*G06F 15/00* (2006.01)
*G06F 3/12* (2006.01)

(52) U.S. Cl.
CPC .......... *G06F 3/1205* (2013.01); *G06F 3/1241* (2013.01); *G06F 3/1244* (2013.01); *G06F 3/1258* (2013.01); *G06F 3/1268* (2013.01)

(58) Field of Classification Search
CPC .... G06F 3/1205; G06F 3/1241; G06F 3/1244; G06F 3/1258; G06F 3/1268
USPC ....................................................... 358/1.9
See application file for complete search history.

(56) References Cited

U.S. PATENT DOCUMENTS

| 8,743,421 B1* | 6/2014 | Ross, Jr. .................. H04N 1/54 358/1.9 |
| 2003/0234942 A1* | 12/2003 | Jeran ...................... H04N 1/603 358/1.9 |
| 2014/0079426 A1* | 3/2014 | Robinson ........... G03G 15/5016 399/82 |

\* cited by examiner

*Primary Examiner* — Mark R Milia
(74) *Attorney, Agent, or Firm* — Lippes Mathias LLP

(57) ABSTRACT

A system and method are provided which enable overriding a custom color callout in a print job. Provision is made for a user to associate a unique ID with a custom color callout in a print job, e.g., during generation of the print job or at the printer. The custom color callout provides for a part of the print job to be rendered with a specific custom colorant, e.g., by identifying the name of the custom colorant. The unique ID is associated, in memory, with a custom colorant station of a print engine, independent of any custom colorant that may be housed in the custom colorant station. The method further includes identifying the custom colorant station of the print engine associated with the unique ID and sending the print job in a format for printing to the print engine for printing the part of the print job with a first custom colorant housed in the identified custom colorant station.

20 Claims, 7 Drawing Sheets

CUSTOM COLOR UNIQUE IDENTIFIER OVERRIDE WORKFLOW

BACKGROUND

The subject disclosure relates to the printing arts, the image processing arts, the color processing arts, custom color printing, and the like. It finds particular application in connection with a system and method for addressing custom colors in print jobs.

In a printing device ("printer"), a controller, often referred to as a digital front end (DFE), is responsible for receiving, preparing, and processing print jobs which are to be rendered by a print engine. The controller receives a print job as input and, based on the instructions contained in the print job, instructs the print engine to apply colorants (such as inks or toners) in varying combinations to create colored hardcopies of the objects/documents in the print job, as output.

The colors which a printer can reproduce on print media are collectively referred to as the printer's color gamut. The color gamut of a printer is a multi-dimensional space of a given volume with the axes of the space being set or defined initially by the pigments used in the colorants of the primary colors. Each set of colorant primaries: such as cyan, magenta, yellow, and optionally black or white (CMYK or CMYW) defines a "color space" that includes all colors that can result from any combination of these primaries. The standard color gamut of many printers is defined by the interaction of the standard CMYK colorants and is limited by a total amount of colorant in any combination that can be effectively deposited on the print media. In other words, it is not possible to print some colors that can be photographed or displayed on a monitor when using CMYK printing alone.

In order to print colors that fall outside of the printer's standard color gamut, some printers enable the use of additional colorants, such as custom colorants (also known as spot colors), for rendering one or more objects in a print job. These are predefined mixtures of colorants, which maybe specified by a customer. The print engine may include one or more additional housings that hold replaceable printing modules, sometimes referred to as a customer replaceable unit (CRU), fifth color module, custom color module, or imaging media cartridges, that store the additional colorant for rendering custom colors. These additional housings for the custom colorants are generally separate from the permanent color printing module housings which store the standard CMYK colorants.

In some printers, custom colorants are used to extend the gamut of the printer beyond the standard gamut which the printer can reproduce using the standard set of colorants. In such applications, extended gamut custom colorant destination profiles are designed to use the custom colorant in regions of the color space that cannot be rendered accurately by the main colors alone. Such gamut extending custom colorants tend to be orange, green, or blue colorants that would normally require a mixture of the standard colorants to achieve a close match.

The extended gamut custom colorants are generally combined with the standard colorants in a single or multi-pass printing process to produce the extended gamut colors by the print engine. When an extended gamut custom color is designated in a print job or page description language (PDL) file, the printer controller identifies the name of the custom colorant, or other identifier, and consults a look-up table. If the name of the extended gamut custom colorant is not in the table, the printer renders the job using a combination of standard colorants which most closely matches the desired color.

In addition to extending the color gamut, custom colorants can also be utilized for other purposes, such as providing reproducibility of custom colors (e.g., in a company logo, where accurate rendering is considered of particular importance. Custom colorants can also be used separately from the standard CMYK colorants to produce a special imaging effect on the print media. For example, by utilizing callouts to specific custom colors in the print job, the custom colorant (or colorants) loaded in the additional housing (or housings) of the printer can be used to print special custom effects such as a representation of a texture like shininess, glossiness, metallic appearance, or transparency, for example.

In the workflow of existing printing systems, if the specific custom colors called for in the print job are not loaded in the additional colorant housing, the system will output a fault message instructing the user to load the correct custom colorant into the custom colorant housing. The problem arises for users when a print job is designed with a specific custom color, but the user also wants to render variations of the print job with a custom color different from the one (or ones) specifically called out for in the original print job design.

In such cases, existing systems require that the user re-design and resubmit the print job with callouts to the name of the custom colorant which is actually loaded in the additional housing for each instance where a different custom color is desired. In other words, the custom color called out by name in the print job (i.e., in a device independent space) generally must always match the name of the custom colorant loaded in the additional housing before the print engine will render the job.

What is needed is a system and method that can render a print job with any desired custom colorant, regardless of which specific custom color is called out for in the original print job and/or which custom colorant is loaded in the custom colorant housing of the print engine.

BRIEF DESCRIPTION

According to one aspect of the exemplary embodiment, a method for overriding a custom color callout in a print job incudes providing for a user to associate a unique ID with a custom color callout in a print job. The custom color callout provides for a part of the print job to be rendered with a specific custom colorant. The unique ID is associated, in memory, with a custom colorant station of a print engine, independent of a custom colorant housed in the custom colorant station. The method further includes identifying the custom colorant station of the print engine associated with the unique ID and sending the print job in a format for printing to the print engine for printing the part of the print job with a first custom colorant housed in the identified custom colorant station.

One or more steps of the method may be implemented by a processor device.

According to another aspect of the exemplary embodiment, a printing system for overriding a custom color callout in a print job includes a graphical user interface generator which generates a graphical user interface that provides for a user to associate a unique ID with a custom color callout in a print job. The custom color callout provides for a part of the print job to be rendered with a specific custom colorant. The unique ID is associated, in memory, with a custom colorant station of an associated print engine, independent of a custom colorant housed in the custom colorant station. A conversion component identifies the custom colorant station of the print engine associated with the unique ID. A custom color override component provides for the print job to be rendered with a first custom colorant present in the identified custom colorant station at the time of printing. An output component sends the print job in a format for printing to the print engine for printing the part of the print job with the first custom colorant housed in the identified custom colorant station. A processor implements the graphical user interface generator, conversion component, custom color override component, and output component.

According to another aspect of the exemplary embodiment a method includes, at a printer, receiving a print job with at least one callout to a custom color in a device-independent space. The printer includes a print engine comprising at least one custom colorant print station. The at least one custom colorant print station is configured to print with a custom colorant, the custom colorant being selected from a plurality of custom colorants supported by the at least one custom colorant print station. The method further includes identifying the at least one callout to the custom color in the print job. A user selectable option of whether to override the callout to the custom color is received. Responsive to receiving the user selectable option to override, the print job is printed using a custom colorant selected from the plurality of supported colorants, the selected custom colorant being configured to render a color, in the device-dependent space, which is the same as or different from the custom color of the callout in the device-independent space. A user selectable option to resubmit the print job is received for printing in the device-dependent space using a second custom colorant selected from the plurality of supported custom colorants.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

Figure 1:
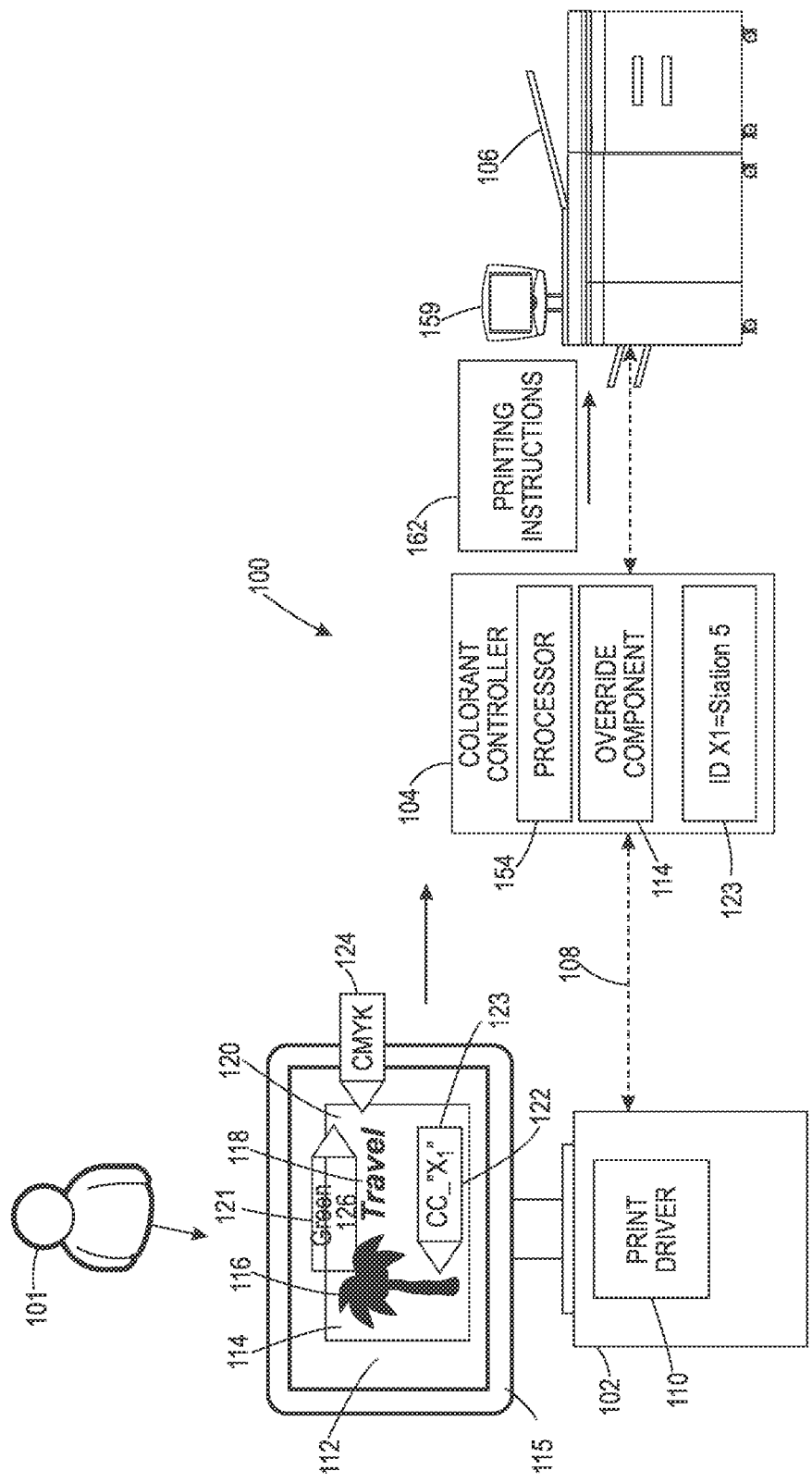
FIG. 1 illustrates an exemplary printing system, according to one aspect of the exemplary embodiment.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

Provided herein are printing systems and methods that enable a custom color override option, whereby a user/operator can render a print job with any desired custom colorant, regardless of which specific custom color is called out for in the original print job design and/or which custom colorant is loaded in the custom colorant housing of the print engine. A graphical user interface providing user-access to the custom color override is also disclosed, along with many other advantages as will be appreciated by those skilled in the art.

The exemplary printing system is operable in first and second modes. In a first mode, custom colors specified in a print job are rendered with corresponding custom colorants. In a second mode (override mode), a unique ID, embedded in or otherwise associated with the print job, triggers a call for a specific colorant station, independent of the colorant it employs.

As used herein, a "printing device" or "printer" can include any device for rendering an image on print media, using colorants, such as inks or toners. Example printers include laser printers, inkjet printers, offset printers, book-making machines, and multifunction devices (MFDs), which provide printing as well as other functions, such as coping and faxing.

A "print medium" can be any physical object suited for printing, such as a sheet of paper, plastic, fabric, or other suitable physical print media substrate for rendering a document.

A "document" is normally a set of related sheets or electronic document pages, from a particular user, or otherwise related, although in some instances, a document may comprise a single sheet or image. Documents to be rendered on the print media by the printer may include digital information comprising images, graphics and/or text.

A "print job" includes one or more documents in a format suitable for processing by a printer and may include one or more page images which define the colors to be printed, e.g., as RGB or CMYK color separation values and custom color identifiers, as well as printing instructions for rendering each page image.

A "colorant" generally refers to a physical substance which is applied to print media to render an image, such as an ink or toner. A colorant may be a standard colorant or a custom colorant.

A "custom colorant" is a colorant which is used singly to render a color in a document that is identified in the document as being a custom color.

A "standard colorant" is a colorant which may be combined with other standard colorants to render colors of a document. Standard colorants are not used to render colors of a document which are tagged as being custom colors, except in specific circumstances, as outlined herein.

As used herein, a "pixel" refers to the smallest segment into which an image can be divided. Received pixels of an input image are associated with color values defined in terms of a device-independent color space, such as RGB, CMYK, or some mathematical transformation thereof.

A "user" can be any person interacting with a graphical user interface.

FIG. 1 illustrates an exemplary system 100 in which various embodiments of the disclosure can be practiced. In the system 100, a user 101 has access to a user computing device 102, which communicates with a colorant controller 104 configured for implementing a custom color override mode, and an associated printer 106, via a network 108. In some embodiments, the controller 104 is integral with the printer 106. In other embodiments, the colorant controller 104 may be at least partially implemented by an intermediate server computer (not shown). The user 101 typically accesses a print driver 110 on the user device 102, e.g., via a graphical user interface 112, for designing a print job 114, which is sent to the printer 106 for printing or related functionalities. The illustrated GUI is displayed on a display device 115, such as a color screen, associated with, or integral with, the user computing device 102.

Generally, the user 101 submits a print job 114 designed with user device 102. The print job may include a document having one or more pages, and each page may have one or more objects such as image, graphics, text, or a combination thereof. For example, an example page of the print job 114 includes image object 116 text object 118, and a background region 120.

The document of the print job 114 is generally output in a page description language (PDL), such as PostScript® or PDF, but other suitable formats may be implemented. The document may further include information about fonts, graphics, and the like that describe the appearance of data, which is to be printed, present within the print job. The document may include a set of programming language commands for processing the document based on the information within the document. In other words, the PDL is a computer language that describes the appearance of a printed page in a higher level than an actual output bitmap.

One or more of the objects 116, 118, 120 in the print job may be associated with a custom color 121. For example, object 118 may be labeled with a custom color name 121 (Green 121") that provides for the object to be rendered with a corresponding custom colorant.

In the exemplary system and method, the print job 114 may provide for one or more parts of the print job, e.g., one or more of the objects, such as object 116, to be associated, in the print job, with a callout (software instruction) 122. The callout 122 includes a unique ID 123, which is specific to a printer location, rather than to a custom colorant. The printer is configured to have a corresponding override printing mode for rendering the object 116 with a custom colorant that need not be specified in the print job, in accordance with the method described below.

The portions of the print job 114 which are not assigned or embedded with a custom color 121 or custom color override via instructions 122 are printed using the standard colorants, which in various combinations, can render the standard color gamut of the printer. Therefore, it should be understood that the print job 114 can generally also be designed with one or more instructions 124 expressed in standard colors, such as in CMYK or RGB color space.

Figure 2:
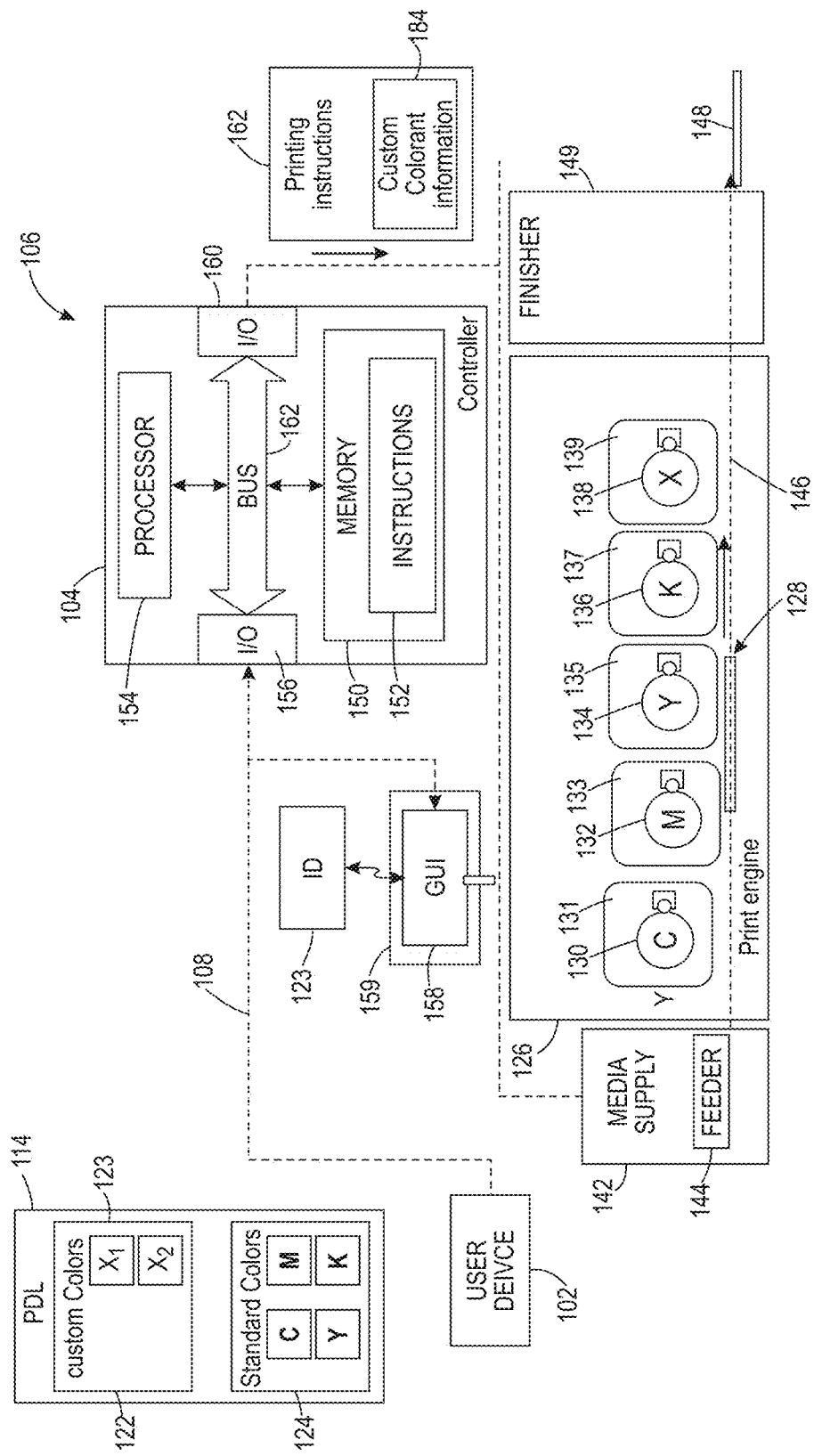
FIG. 2 is a functional block diagram illustrating a schematic configuration of a printer, according to another aspect of the exemplary embodiment.

With reference also to FIG. 2, the printer 106 includes a print engine 126, which is configured to apply colorants (illustrated as C (cyan), M (magenta), Y (yellow) and K (black) for standard colorants, and X (a custom colorant)) to print media 128. The illustrated colorants are supplied from a set of colorant housings 130, 132, 134, 136, 138, associated or integral with respective print stations 131, 133, 135, 137, 139. In the illustrated print engine 126, the custom colorant X is provided from the last (most downstream) housing 138, although other locations are contemplated. The custom colorant X installed in the custom colorant housing 138 is used, by the custom colorant station 139, to reproduce the custom color in a custom color printing mode. As will be appreciated, there may be more than one housing 138/print station 139 for respective custom colorants. The print engine applies the custom colorant(s) separately from the standard CMYK colorants to produce a specific color or for special imaging effect on the print media. For example, such special imaging effects may include a representation of a texture like shininess, glossiness, metallic appearance, or transparency, highlighting objects with a fluorescent color, etc.

A media supply 142 holds a supply of the print media, e.g., sheets 128. A feeder 144 feeds the print media to the print engine 126, where a transport path 146, carries the print media in a downstream direction to an output device 148, optionally after passing through a finisher 149. The transport path 146 may include any combination of belts, rollers, nips, drive wheels, vacuum devices, air devices, etc., for advancing the sheets. In the print engine, colorants are applied from the colorant stations, e.g., by inkjets or a photoreceptor (not shown), to form a printed image on the print media. The finisher 149 may stack, fold, staple, sort, etc., the various printed sheets.

The controller 104 includes memory 150, which stores instructions 152 for implementing the method described herein and a processor 154, in communication with the memory, for executing the instructions. An input device 156 receives incoming print jobs 114 and user instructions from a GUI 158 displayed on a display device 159 associated with the printer. An output device 160 outputs printing instructions 162 for rendering each page to the print engine 126. A data/control bus 164 communicatively connects the hardware components 150, 154, 156, 160 of the controller 104.

Figure 3:
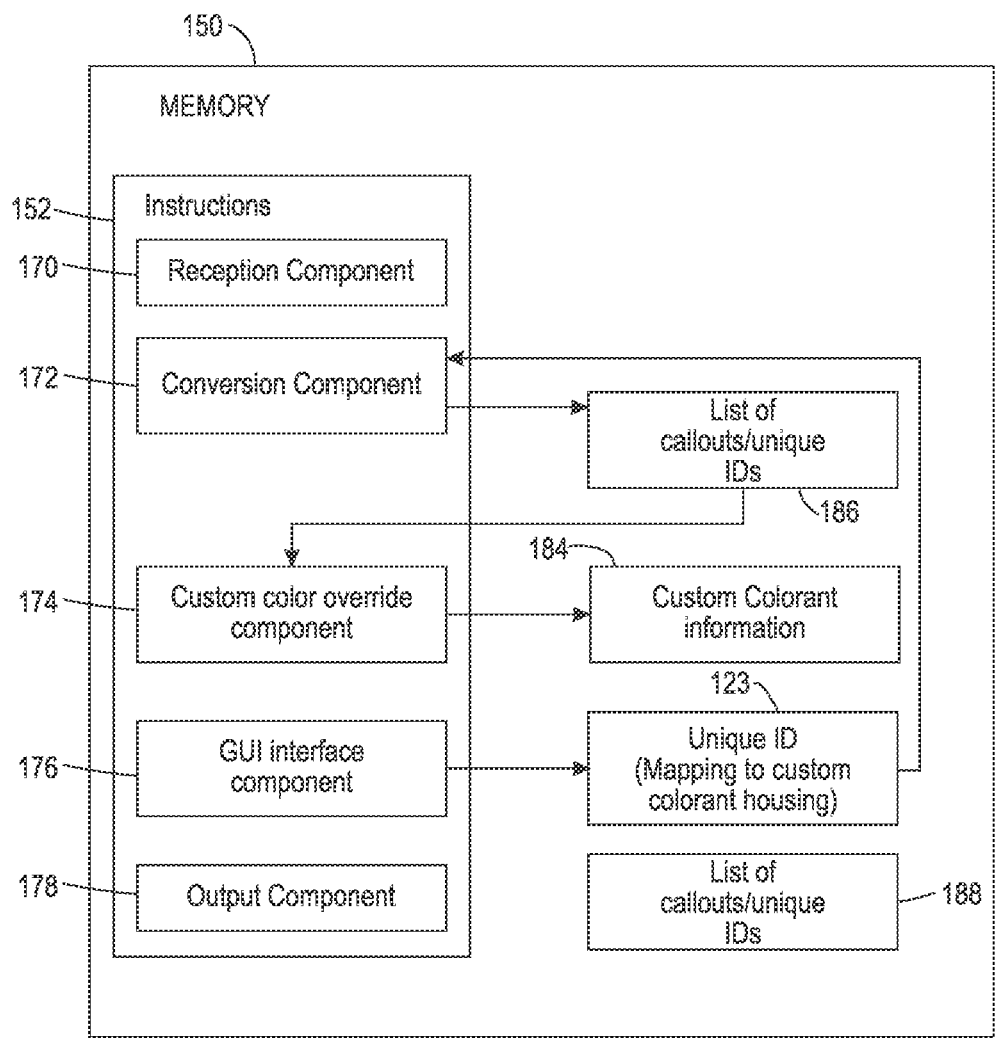
FIG. 3 illustrates components of a custom color override controller according to another aspect of the exemplary embodiment.

The instructions 152 include instructions for converting the print job into a form in which it can be rendered by the print engine 126. This includes, for each pixel of each page image, identifying the standard colorants and/or custom colorant(s) to be applied by the print engine to the print media 128. For example, as illustrated in FIG. 3, the instructions 150 include a reception component 170, a conversion component 172, a custom color override component 174, a GUI interface component 176 and an output component 178.

Briefly, the reception component 170 receives an input print job, and stores it in memory 150.

The conversion component 172 converts the document(s) from the device-independent space format to a device-dependent space format that is specifically designed and optimized for the intended print engine 126. This includes converting the colors of pixels in the device-independent space to standard colorant values and assigning custom colorant to the pixels that are assigned custom colors. The conversion component 172 may include one or more raster image processors that render from a page description language (PDL) such as PostScript, PDF or XPS to a raster: a pixel-based representation of the page suitable for delivery to the print heads of the print engine 126. The conversion component 172 has access to look-up tables for performing the standard color to colorant conversions and access to information as to the colorants in each of the housings 130, 132, 134, 136, 138. In particular, conversion component 172 knows that housing 138 of the print engine 126 is configured to supply a custom colorant to station 139. Moreover, the types of custom colorants which can be installed in the custom colorant housings 138 are also known, since this information is predefined and based on the type of print engine utilized. If, however, a unique identifier 123 has been associated with one or more of the custom color callouts 121, the conversion component 172 calls on the custom color override component 174.

The custom color override component 174 implements an override process when triggered. In the exemplary embodiment, the trigger may be in the form of the unique identifier (ID) 123. When the override process is implemented, the unique ID 123 also functions as a link or mapping between the custom callout 122 in the device-independent space (i.e., the print job 114) and a physical location in the device-dependent space (specifically, the additional housing 138 of the print engine 126 where the custom colorant is or can be loaded). This permits the user to design one print job in the device-independent color space which, through use of the unique ID 123, can be used to reproduce the multiple variations of the job in the device-dependent color space. This enables a single print job 114 to be used to generate multiple reproductions of the print job with any or all of the custom colorants that may be configured for use in the additional printer housing 138.

The user 101 may input or otherwise select an option for attaching the unique ID 123 as a label or tag to the pertinent custom color callout (e.g., callout 122. The unique ID 123 may be associated with the custom color either at the job level (i.e., when designing print job 114 in the device-independent color space) or during processing of the print job by the controller 104. For example, the user may request that a unique ID 123 be associated with the custom color via the GUI 158. The request for the unique ID 123 is received by the GUI interface component. The unique ID 123 may be selected by a user or automatically generated by the system, e.g., by the controller 104 or print driver 110.

The custom color override component 174 recognizes that a unique ID 123 has been introduced into the workflow as a tag to the corresponding custom color callout (whether at the job level or the system level) and adds custom colorant information 184 to the printing instructions 162. For example, The print job 114 illustrated in FIG. 2 as a PDL file includes a callout 122 for two custom colors $X_1$ and $X_2$. Thus, two mappings 123 may be defined, which each provide a link for one of the custom colors $X_1$ and $X_2$ in the callout 122. These mappings 123 may be to the same or different custom colorant housing(s) 138 of printing engine 126. In another embodiment, where there are two or more custom colors $X_1$ and $X_2$ in the callout, they may be assigned to the same unique ID and thus are mapped to the same custom colorant housing 138. The maximum number of mappings or unique IDs 123 available for a given printing device is dependent on the number custom colorant print stations 139 available in the associated print engine(s) 126.

Accordingly, the same mapping/unique ID can be applied to link multiple different custom color callouts to one custom color print station housing 138. In this case, the custom colorant print station(s) 139 can be configured to use one, more than one, or all of the custom colorant types which are installable at the print engine 126. This allows any custom color callout to be mapped or assigned with a unique ID to any custom colorant print station, depending on the limitations of the print engine 126 and/or the design choices of the user.

Some examples of different custom colorants which can be installed in the housing(s) 138 of the custom colorant printing stations 139 include but are not limited to: (a) metallic colorants, including gold, silver, and mixed metallics; (b) fluorescents, including yellow, cyan, and magenta fluorescents; (c) overlay inks, including gold, silver, white, clear, and low gloss clear inks; (d) underlay inks, including gold, silver, and white inks; and, (e) clear inks including low gloss clear and regular clear inks.

It is noted that the PDL file 114, as illustrated in FIG. 2. may also contain the one or more callouts 140 to standard CMYK separations. In this regard, the conversion component 172 is aware that the print engine 126 includes various standard color print stations 131, 133, 135, 137 configured to receive standard colorants in corresponding housings to print using the printer's permanent CMYK colors.

The standard CMYK colorants are generally intended to be installed in respective housings and are only replaced when defective/empty. In contrast, the colorants for custom colors are often provided as replaceable cartridges (not shown), which can be easily installed within the custom colorant housing(s) 138 of print station(s) 138 and are regularly switched by users to provide different colors during different printing operations.

The output component outputs the printing instructions 162, including any custom colorant information 184 to the print engine to proceed rendering the job with any custom colorant loaded in the additional housing (provided the custom colorant can be used and/or is licensed for use in the additional housing of the associated printer).

In contrast, existing printing systems which include an additional housings for custom colorants, print jobs designed with callouts to custom colors instruct the use of a color name in the device-dependent space (i.e., the custom colorant housing of the print engine) which has the same name as that identified by the callout 122 in the device-independent space. That is, the callout in the device-independent space needs to provide a custom color name which matches the name of the custom color loaded in the device-dependent space at the time of printing. Otherwise, the system will output a fault message instructing the user to load the correct custom colorant into the custom colorant housing. As a result, users of existing printing systems need to design and submit a new print job with the appropriate custom color callout each time it is desired to render the job at the printer in a different custom color. However, re-designing and re-submitting print jobs in this manner is time-consuming and adds cost to the overall printing process.

In one embodiment, the custom color workflow is implemented for a desired custom color callout 140 at the job level by embedding the unique ID 123 within the print job 114 prior to submitting the print job to the printer.

In another embodiment, the custom color workflow is implemented at the system level after the print job 114 is received by the printer, by entering the unique ID 123 as a tag to for any desired custom color callout 122 identified by the conversion component 172.

As a result, the exemplary system 100 is configured to render the print job for printing regardless of whether the name of the colorant loaded in the custom colorant of the print engine matches the name of the specifically called-for custom color.

The controller 104 is able to load files from various sources and process them in order to be printed with the print engine. The controller may also control the operations of various components of the printer, such as the print engine 204, feeder 144, transport path 146, and finisher 149.

The term "software" or "instructions," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

It will be appreciated that the printer 106 is capable of implementation using a distributed computing environment, such as a computer network, which is representative of any distributed communications system capable of enabling the exchange of data between two or more electronic devices. It will be further appreciated that such a computer network includes, for example and without limitation, a virtual local area network, a wide area network, a personal area network, a local area network, the Internet, an intranet, or the any suitable combination thereof. Accordingly, such a computer network comprises physical layers and transport layers, as illustrated by various conventional data transport mechanisms, such as, for example and without limitation, Token-Ring, Ethernet, or other wireless or wire-based data communication mechanisms.

The processor 154 can be variously embodied, such as by a single core processor, a dual core processor (or more generally by a multiple core processor), a digital processor and cooperating math coprocessor, a digital controller, or the like. In one embodiment the processor 154 may comprise a special purpose processor that is specialized for processing image data and includes a dedicated processor that may operate differently from a general purpose processor because the dedicated processor has application specific integrated circuits (ASICs) that are specialized for the handling of image processing operations, processing image data, calculating pixel values, etc.

The memory 150 may represent any type of non-transitory computer readable medium such as random access memory (RAM), read only memory (ROM), magnetic disk or tape, optical disk, flash memory, or holographic memory. In one embodiment, the memory 150 comprises a combination of random access memory and read only memory. In some embodiments, the processor 154 and memory 152 may be combined in a single chip. Memory 152 may store data generated and/or processed in the exemplary method as well as the instructions 152 for performing the exemplary method.

The network interface(s) 156, 160 allow the controller 104 to communicate with other devices via a computer network, and may comprise a modulator/demodulator (MODEM). That is, the I/O interface may utilize one or more data communication links 108 for operative connection with the external devices, such as the user computing device 102 and print engine 126. The links may be accomplished via any suitable channel of data communications such as wireless communications, for example Bluetooth, WiMax, 802.11a, 802.11b, 802.11g, 802.11(x), a proprietary communications network, infrared, optical, the public switched telephone network, or any suitable wireless data transmission system, or wired communications.

The graphical user interface (GUI) 158 permits user access and interaction with the controller 104 and is representative of any interfacing device, such as an integrated user interface physically coupled to the print engine, or any personal computing device, such as a personal computer, a netbook computer, a laptop computer, a workstation computer, a personal data assistant, a web-enabled cellular telephone, a tablet computer, a proprietary network device, or other web-enabled electronic device.

Figure 4:
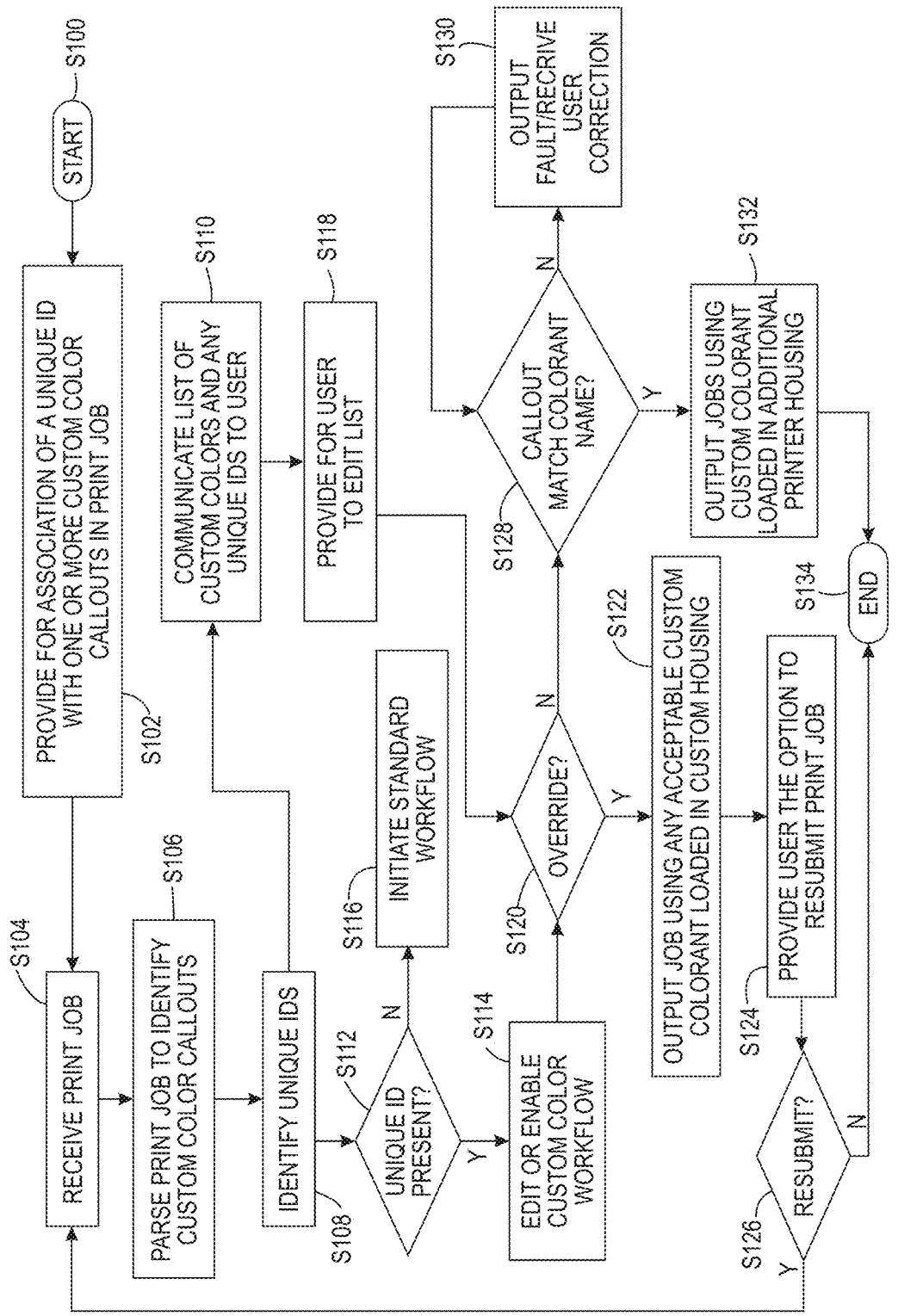
FIG. 4 is a flow chart illustrating a method for implementing a custom color override mode, according to another exemplary embodiment.

With reference to FIG. 4, a flowchart is provided which represents an exemplary method, which can be performed in the system of FIGS. 1-3. The method starts at S100.

At S102, provision is made for a user to associate one or more unique IDs 123 with one or more custom color callouts 122 in a print job 114, e.g., by the print driver 110 or GUI interface component 176. The unique ID is associated, in memory 150, with a specific one of the custom colorant stations 139, independent of any custom colorant that housed in that custom colorant station. Thus, the part of the print job specified in the callout 122 will be rendered with the colorant that is in the custom colorant station at the time of printing, even if different from the custom colorant that is associated, in memory 150, with the specific custom color in the callout.

At S104, a print job, such as print job 114 is received, e.g., by the reception component 170. As discussed above, the print job includes one or more objects embedded or tagged with an instruction or callout (e.g., callout 122) to use a custom color for one or more pixels of a page image during rendering by the print engine 126.

At S106, the print job is parsed, e.g., by the conversion component 172, to identify custom color callouts and other information. In particular, the conversion component parses the print job received to identify all callouts to custom colorant names embedded in the print job. A list 186 of the identified custom color callouts is generated.

At S108, any unique IDs associated with the custom color callouts are identified. In particular, the conversion component identifies whether any of the custom color callouts in the list 186 were tagged with a unique ID during design of the print job (or subsequently). For each custom color callout identified as being tagged with a unique ID, the list generated in step S106 is updated with the respective unique ID.

For example, the list 186 may include some or all the information exemplified in Table 1:

TABLE 1

| CALLOUT | CUSTOM COLOR | UNIQUE ID | COLORANT CURRENTLY HOUSED IN COLORANT STATION |
|---|---|---|---|
| X1 | Gold 132 | Colorant station 6 | Silver 313 |
| X2 | White | Colorant station 1 | White |
| X3 | Yellow 015 | — | |

At S110, the list 186 of custom color callouts and any corresponding unique IDs may also be communicated to the user via a communications facility, such as the graphic user interface (GUI) 158, which is described further detail below with reference to FIG. 5.

If at S112, unique IDs were found, the list 186 of callouts and unique IDs is output to the custom color override component 174 and the method proceeds to S114, otherwise to S116.

At S114, the custom color override workflow is initiated. In particular, the custom color override component 174 receives the list 186 of custom color callouts generated at S108. The list may include custom color callouts tagged with the unique ID, untagged custom color callouts, or a combination of both. For each tagged custom color callout (if any), the corresponding unique ID is represented as a value which can be edited or removed as desired, e.g., by the user via the attached GUI 158. As such, the user can check that the appropriate unique ID was attached to the one or more objects as desired during the design of print job 114. The user can also interact with the GUI 158 to edit or delete the unique ID for a tagged custom color callout if necessary.

At S118, for each untagged custom color callout (if any), the user may be provided with a user selectable option to implement the custom color workflow if desired (e.g., the user can tag any previously untagged custom color callout with the unique ID). The user selectable option is communicated to the user via a communications facility, such as GUI 158, and can be processed "on-the-fly". The list 186 is then updated. For example, Table 1 may be updated as follows:

TABLE 2

| CALLOUT | CUSTOM COLOR | UNIQUE ID | COLORANT CURRENTLY HOUSED IN COLORANT STATION |
|---|---|---|---|
| X1 | Gold 132 | Colorant station 6 | Silver 313 |
| X2 | White | Colorant station 1 | White |
| X3 | Yellow 015 | Colorant station 4 | Standard Yellow |

The method then proceeds to S120.

At S120, a verification that the override workflow should be implemented during printing may be performed. For example, the custom color override module 174 is queried to perform a final check of the custom color callout list to determine whether the unique ID remains tagged to a corresponding custom color callout after any user editing that may occurred as described above in S118. For each custom color callout verified as having been tagged with the unique ID, the process proceeds to S122. If no custom color callout is verified as being tagged with the unique ID, the method proceeds to S124.

At S122 the print engine is instructed to output the print job, provided that any acceptable custom color colorant is loaded in the pertinent custom colorant print station housing 138 that is linked by the unique ID. This may include instructing the print engine to override the standard workflow process steps S116.

It is noted that a custom color colorant is considered "acceptable" if it is known to work with or otherwise be licensed for use in the additional housing of the associated print engine, which is known by the system. That is, the controller knows which custom color colorants the print engine 126 is configured to use and knows which custom housings within the printer which are configured to receive the pertinent custom color colorants, e.g., by accessing a list 188 stored in memory 150.

At S124, a user selectable option to resubmit the print job may be communicated to the user. The user selectable resubmit option is communicated to the user via a communications facility, such as GUI 158.

If at S126, the user selects to resubmit the job, the process returns to S104. It is noted that if the user decides to resubmit the print job, the user should also load a different custom color colorant in the pertinent custom housing to achieve the desired custom color variation.

If at S126, the user does not select to resubmit the job, the process ends at S134.

If at S120 (or S116), no custom color callout tagged with the unique ID is identified, the method may implement a standard workflow. For example, at S128, a check is performed to verify that the custom color name called out in the print job matches the custom color colorant name loaded in the pertinent custom printer housing. If the names do not match, a fault message may be output at S130, instructing the user to install the correct custom color colorant in the housing. The fault message may be communicated to the user via a communications facility such as GUI 158. If the user attends to the fault, the method may return to S128.

If at S128, the names match, then at S132, the print job is output using the pertinent custom color colorant loaded in the additional printer housing.

The method ends at S134.

Figure 5:
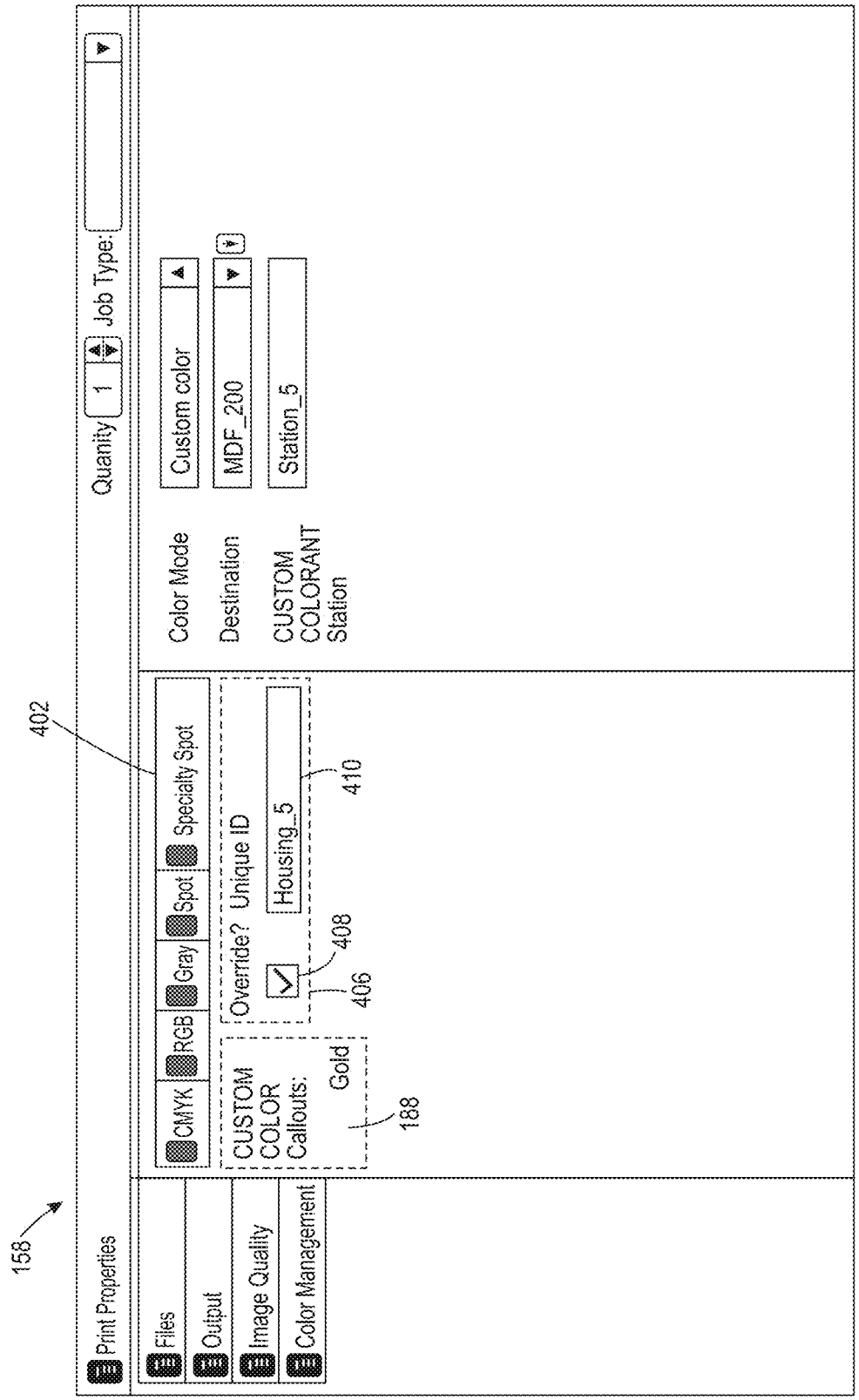
FIGS. 5 and 6 illustrate a graphical user interface (GUI) for use in implementing the custom color override mode, according to another exemplary embodiment.
Figure 6:
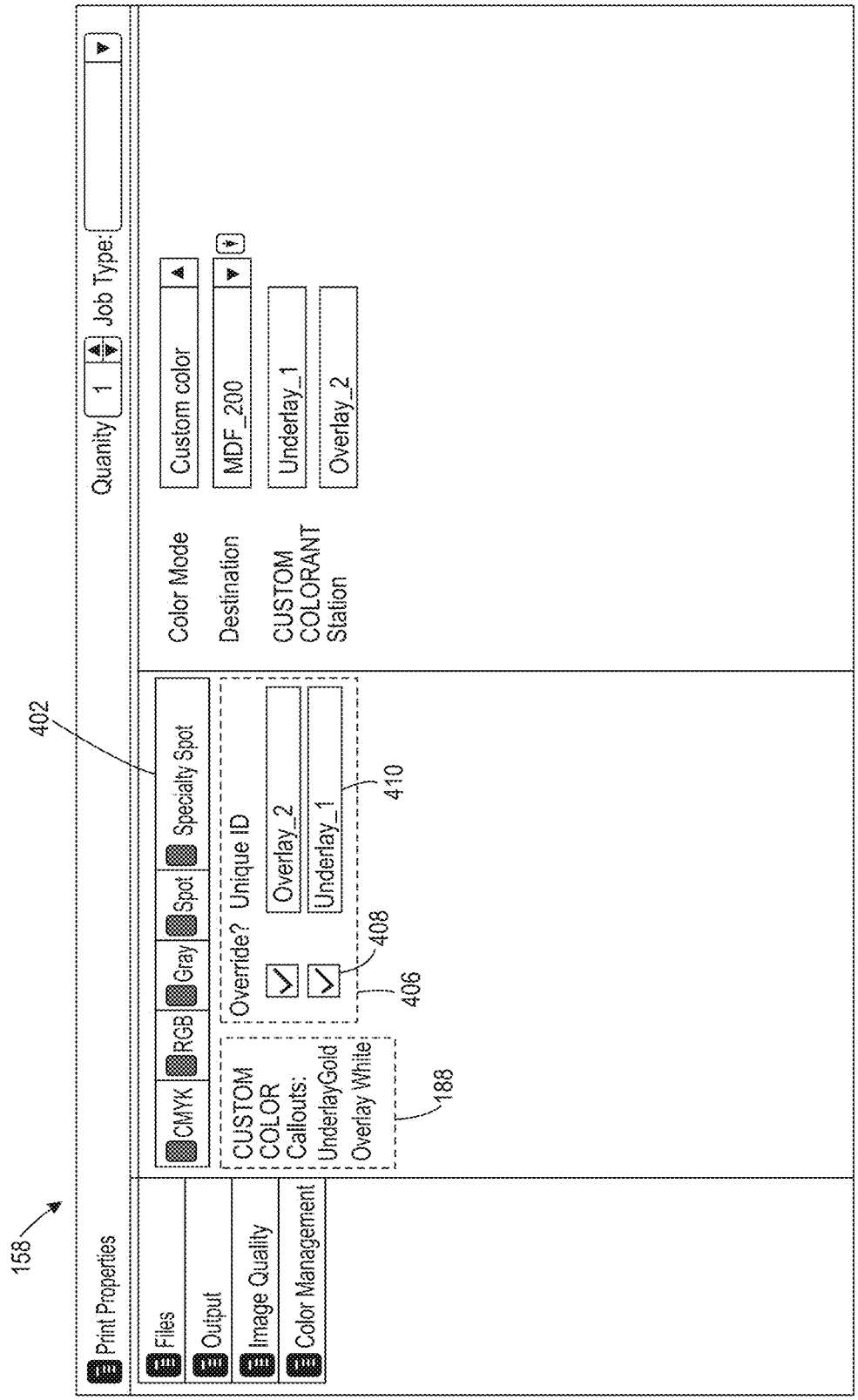

FIGS. 5 and 6 show an exemplary GUI or user interface 158 suited to use in the system of FIG. 2. The exemplary user interface 158 provides a custom color option indicated as 402. Under the custom color option, the user interface 158 communicates the list 188 of all custom color callouts in the submitted print job, as identified by the controller.

The user interface further communicates one or more user selectable options 406 related to the exemplary custom color override. The one or more user selectable options 406 may include at least one of a check box 408 or text box 410 which the user can utilize to implement the custom color override process as desired. In other words, the one or more user selectable options 406 provide the unique ID tagging functionality for the user to decide whether to implement or cancel the custom color override process for a given custom color callout (S120).

Upon entering the custom color option 402, the user interface 158 presents the one or more user selectable options 406 as either being pre-populated with a value or as being blank for receiving a value to be input by the user. For example, the unique ID feature can be introduced into the workflow of the system to implement the custom color override process at either the job level (i.e., designing print job 114 in the device-independent space 116) or at the system level, after the print job has been generated and output from the user device (e.g., at the printer 106). Moreover, as discussed in further detail below, the unique ID is named such that the "value" thereof is the same in both the device-independent and device-dependent spaces.

If the print job is designed with the unique ID 123 embedded therein, then upon entering the custom color option 402, the user interface 158 presents the one or more user selectable options 406 as pre-populated with the pertinent values (i.e., a check mark for box 408 and/or the unique ID name for box 410). However, the user interface 158 also permits the pre-populated values of the or more user selectable options 406 to be removed or otherwise edited by the user.

Alternatively, if the unique ID 123 is not embedded in the print job during design, then upon entering the custom color option 402, the one or more user selectable options 406 are blank. The user interface 158 permits the user to assign the pertinent values if desired (i.e., click box 408 to place a check mark and/or type the unique ID value into box 410).

In the example user interface 158 illustrated by FIG. 5, the destination of the print job is a print engine denoted "MFD_200" having five marking stations and a custom color printing mode. It is assumed that the fifth print station (custom colorant "Station_5") of the associated print engine is configured to print special effects using one or more custom colorants. The user interface 158 also indicates a non-limiting example where the custom color callout in the print job is for color "Gold" and the exemplary unique ID is "Housing_5". The unique ID "Housing_5" means the same thing when embedded in the print job as a unique ID tagged to a custom color callout or when "Housing_5" is entered as a value in the pertinent selectable option (e.g., text box 410) presented by the user interface 158. That is, in the example of FIG. 5, the unique ID "Housing_5" means the housing of the fifth station in the associated print engine configured to print the system's custom colors.

In the example illustrated by FIG. 6, the exemplary user interface 158 is communicatively attached to a six-colorant print engine (Destination "MFD_202") having six marking stations and a custom color printing mode ("Custom"). It is assumed that custom colorant print stations denoted "Underlay_1" and "Overlay_2" of the associated print engine are configured to print custom effects using one or more custom colorants. Moreover, in FIG. 6, the user interface 158 indicates a non-limiting example where the print job has custom callouts for underlay color "Gold" and overlay color "White" and the exemplary unique ID names are "Underlay_1" and "Overlay_2". The unique ID "Underlay_1" means the housing of the print station in the associated print engine configured to print the system's custom colors as an underlay, and the unique ID "Overlay_2" means the housing of the print station in the associated print engine configured to print the system's custom colors as an overlay. As illustrated in FIG. 2, the 6th housing and respective print station for the underlay custom color may be located upstream of the standard colorant stations in the print engine, between the feeder 144 and the print station 131, as illustrated at Y.

Thus, the user interface 158 as illustrated in FIG. 6 corresponds to a print job designed with underlay objects in the color "Gold" and overlay objects in the color "White". By tagging the "Underlay_Gold" callout with the unique ID "Overlay_2" and tagging the "Overlay_White" callout with the unique ID "Underlay_1", the associated printer can render the single print job as an input and output two (or more) variations on an print medium, e.g., one variation with "Gold" as the underlay color and "White" as the overlay color and another variation with "White" as the underlay color and "Gold" as the overlay color.

Figure 7:
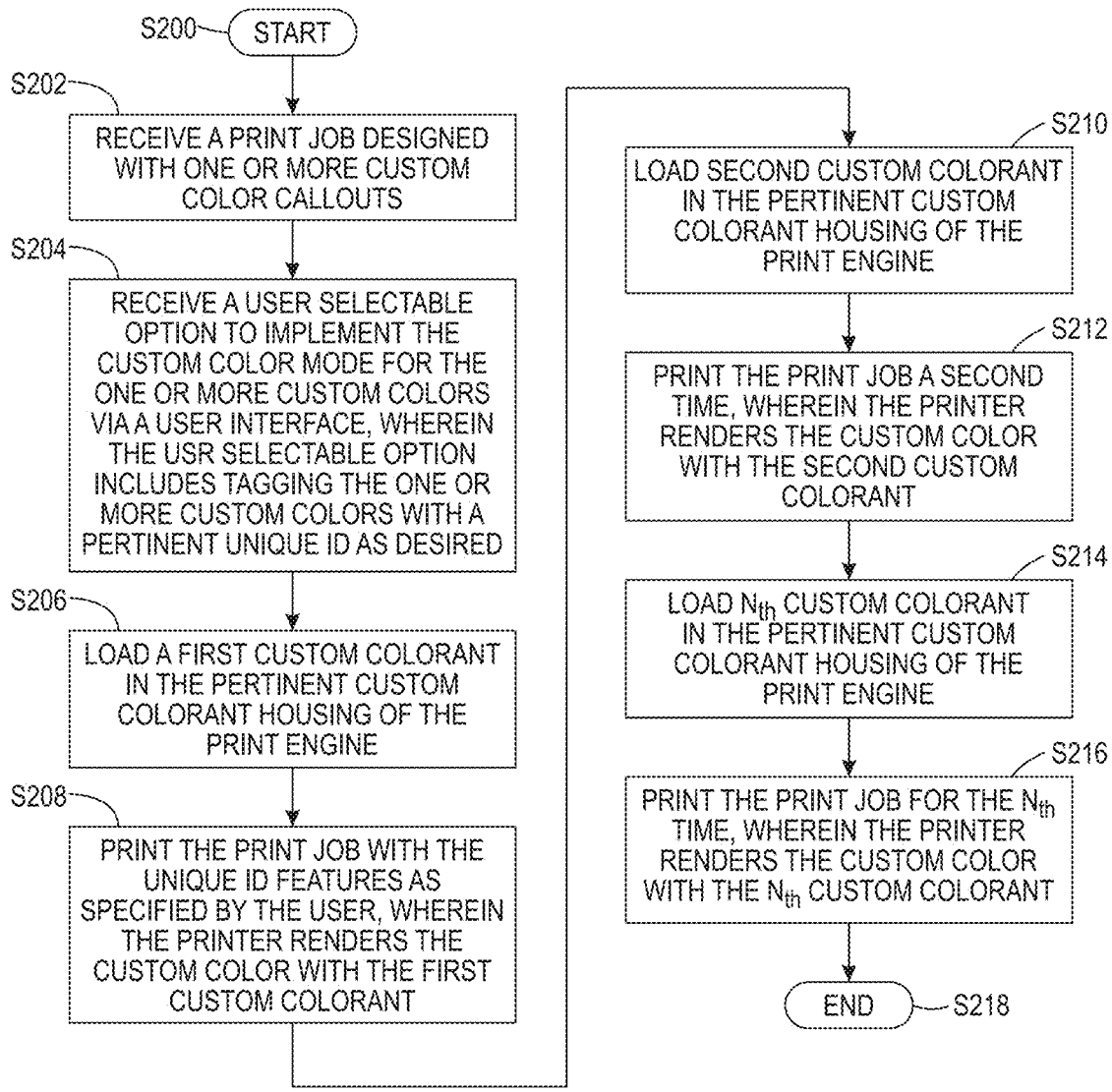
FIG. 7 is a flowchart illustrating a method for printing a print job while implementing the custom color override mode as specified by a user and according to another exemplary embodiment.

FIG. 7 illustrates a method for printing with the exemplary custom color colorant override feature being implemented. The method starts at S200. At S202, a print job is received from a user. The print job is designed with one or more custom color (custom color) callouts and submitted by the user via an application such as Adobe InDesign Software or PDL running on a computing device of the user. The print job is received in a job queue at a printer or a print server application.

At S204, a user selectable option for tagging each custom color callout with the pertinent unique ID is received via a user interface (e.g., GUI 158) of the printer. The user selectable option includes whether to implement the custom color override (custom color) process by tagging with the unique ID.

At S206, the user loads a first custom color colorant (custom colorant) in the pertinent custom colorant housing of the print engine associated with the printer and information concerning the first custom colorant is stored in memory accessible to the controller. The first custom colorant loaded into the housing can correspond to the custom color actually called out in the print job or can correspond to a different custom color depending on the design variations desired by the user.

At S208, the print engine renders the custom color with the first custom colorant on a print medium.

At S210, the user loads a second custom colorant in the pertinent custom colorant housing of the print engine associated with the printer and information concerning the second custom colorant is stored in memory accessible to the controller. The second custom colorant loaded into the housing can correspond to the custom color actually called out in the print job or can correspond to a different custom color depending on the design variations desired by the user.

At S212, the print engine renders the custom color with the second custom colorant on an image receiving medium.

At S214, the user loads an Nth custom colorant in the pertinent custom colorant housing of the print engine associated with the printer. As used herein, the variable "N" corresponds to the user's desired number of design variations which will be printed with different custom colorants using a single print job.

At S216, the print engine renders the custom color with the Nth custom colorant on an image receiving medium.

The method ends at S218, or may return to S202 for the next print job.

In this manner, the method illustrated in FIG. 7 allows the user to design the print job with a specific custom color and, using the same print job, render multiple variations with a different custom color at the printer.

The method illustrated in FIGS. 4 and/or 7 may be at least partially implemented in a computer program product that may be executed on a computer such as one or more of the illustrated user device 102, controller 104, and/or an intermediate server computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer(s) (for example, an internal hard drive of RAM), or may be separate (for example, an external hard drive operatively connected with the computer), or may be separate and accessed via a digital data network such as a local area network (LAN) or the Internet (for example, as a redundant array of inexpensive or independent disks (RAID) or other network server storage that is indirectly accessed by the computer 30, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine that is in turn capable of implementing the flowchart shown in FIGS. 4 and/or 7, can be used to implement the method for implementing first and second custom colorant modes. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method for overriding a custom color callout in a print job, comprising:
   providing for a user to associate a unique ID with a custom color callout in a print job, the custom color callout providing for a part of the print job to be rendered with a specific custom colorant which is a predefined mixture of colorants, the unique ID being associated, in memory, with a custom colorant station of a print engine, independent of a custom colorant housed in the custom colorant station;
   identifying the custom colorant station of the print engine associated with the unique ID; and
   sending the print job in a format for printing to the print engine for printing the part of the print job with a first custom colorant housed in the identified custom colorant station, the first custom colorant being different from the specific custom colorant called out in the print job.

2. The method of claim 1, wherein the providing for the user to associate the unique ID with the custom color callout comprises displaying, on a user interface, a selectable option to associate the unique ID with the custom color callout.

3. The method of claim 1, wherein the providing for the user to associate the unique ID with the custom color callout comprises providing for the user to associate the unique ID with the custom color callout during generation of the print job.

4. The method of claim 1, wherein the providing for the user to associate the unique ID with the custom color callout comprises providing for the user to associate the unique ID with the custom color callout after generation of the print job.

5. The method of claim 1, wherein the method further comprises, after the first custom colorant in the identified custom colorant station has been replaced with a second custom colorant, different from the first custom colorant, sending the print job to the print engine for printing the part of the print job with the second custom colorant housed in the identified custom colorant station.

6. The method of claim 1, wherein the first custom colorant is a different color from the specific custom color in the callout.

7. The method of claim 1, wherein the identifying of the custom colorant station of the print engine associated with the unique ID comprises accessing a list in which each of a plurality of unique IDs is associated with a custom colorant station.

8. The method of claim 1, further comprising, prior to sending the print job to the print engine for printing, confirming with the user that the callout for the first custom color should be overridden with the custom colorant associated with the unique ID.

9. The method of claim 1, further comprising, when the print job has no unique ID associated with a callout for a first custom color and the print engine lacks a custom colorant corresponding to the first custom color, providing for the user to associate a unique ID with the callout.

10. The method of claim 1, further comprising providing for the user to modify the unique ID associated with the custom color callout.

11. The method of claim 1, wherein the print job comprises a Page Description Language (PDL) supported document.

12. The method of claim 1, wherein when the print job comprises a plurality of callouts to respective custom colors to be rendered with a plurality of custom colorants, the method comprises providing for the user to associate a unique ID with each of the plurality of custom color callout in the print job.

13. The method of claim 1, wherein the print engine comprises a fifth or sixth colorant print engine with one or two custom print stations, respectively.

14. A system comprising memory storing instructions for performing the method of claim 1 and a processor in communication with the memory, which executes the instructions.

15. A computer program product comprising a non-transitory recording medium storing instructions, which when executed by a processor, perform the method of claim 1.

16. A printing system for overriding a custom color callout in a print job, comprising:
   a graphical user interface generator which generates a graphical user interface that provides for a user to associate a unique ID with a custom color callout in a print job, the custom color callout providing for a part of the print job to be rendered with a specific custom colorant, the unique ID being associated, in memory, with a custom colorant station of an associated print engine, independent of a custom colorant housed in the custom colorant station;
   a conversion component which identifies the custom colorant station of the print engine associated with the unique ID;
   a custom color override component which, in one mode of operation, provides for the print job to be rendered with a first custom colorant present in the identified custom colorant station at the time of printing which is different from the specific custom colorant;
   an output component which sends the print job in a format for printing to the print engine for printing the part of the print job with the first custom colorant housed in the identified custom colorant station; and
   a processor which implements the graphical user interface generator, conversion component, custom color override component, and output component.

17. The printing system of claim 16, further comprising the print engine which renders the print job.

18. The printing system of claim 17, wherein the print engine comprises a plurality of custom colorant stations and wherein the graphical user interface provides for a user to associate a plurality of unique ID with a plurality of custom color callouts in a print job.

19. The printing system of claim 16, further comprising a display device which displays the graphical user interface to the user.

20. A method, comprising:

providing for a user to associate a unique ID with a custom color callout in a print job, the custom color callout providing for a part of the print job to be rendered with a specific custom colorant which is a predefined mixture of colorants, the unique ID being associated, in memory, with a custom colorant print station of a print engine of a printer, independent of a custom colorant housed in the custom colorant print station;

at the printer, receiving the print job with the custom color callout to a custom color in a device-independent space, the print engine comprising a set of standard colorant print stations, each being configured to print with a respective one of a set of standard colorants, and the custom colorant print station, the custom colorant print station being configured to print with a custom colorant, the custom colorant being selected from a plurality of custom colorants supported by the at least one custom colorant print station;

identifying the at least one callout to the custom color in the print job;

receiving a user selectable option of whether to override the callout to the custom color;

responsive to receiving the user selectable option to override, printing the print job using the specific custom colorant that is associated in memory with the unique ID, the specific custom colorant being configured to render a color, in device-dependent space, which is the same as or different from the custom color of the callout in device-independent space; and, receiving a user selectable option to resubmit the print job for printing in the device-dependent space using a second custom colorant selected from the plurality of supported custom colorants.

* * * * *